United States Patent [19]
Aaen et al.

[11] 3,773,127
[45] Nov. 20, 1973

[54] SNOWMOBILE HAVING NOISE-SUPPRESSION ENGINE COMPARTMENT

[75] Inventors: Olav Aaen, Kenosha, Wis.; Kenneth J. Friend, Waukegan, Ill.; Eugene Hackbarth, Kenosha, Wis.; Harry M. Ward, III, Waukegan, Ill.

[73] Assignee: Outboard Marine Corporation, Waukegan, Ill.

[22] Filed: Dec. 29, 1972

[21] Appl. No.: 319,891

[52] U.S. Cl. ............ 180/5 R, 180/54 A, 180/64 A
[51] Int. Cl. ..................... B60k 11/06, B60k 13/06
[58] Field of Search ............... 180/64 A, 54 A, 5 R

[56] References Cited
UNITED STATES PATENTS

| | | | |
|---|---|---|---|
| 1,560,351 | 11/1925 | Seidel | 180/64 A |
| 1,831,159 | 11/1931 | Burrows | 180/64 A |
| 2,138,001 | 11/1938 | Flour | 180/54 A |
| 3,559,611 | 2/1971 | Cushman | 180/5 X |
| 862,250 | 8/1907 | Herman | 180/64 A |
| 1,934,385 | 11/1933 | Strauss | 180/64 A |
| 2,242,494 | 5/1941 | Wolf | 180/64 A |
| 2,390,218 | 12/1945 | Lamb | 180/64 A |
| 2,644,541 | 7/1953 | Bachle | 180/64 A |
| 2,680,490 | 6/1954 | Dafoe | 180/64 A |
| 2,901,052 | 8/1959 | Rabe | 180/64 A |
| 3,147,814 | 9/1964 | Suhre | 180/64 A |
| 3,205,964 | 9/1965 | Biabaud | 180/64 A |

*Primary Examiner*—Richard J. Johnson
*Attorney*—Robert E. Clemency

[57] ABSTRACT

Disclosed herein is a snowmobile including a hood extending from a frame portion to a transverse partition extending upwardly from a frame portion and defining, with the frame portion and the transverse partition, a substantially closed and substantially air tight engine compartment. A wall extending in the engine compartment divides the engine compartment into an air supply chamber and an exiting air chamber. The engine muffler and other engine exhaust system components are located within the exiting air chamber which includes one or more air outlets, preferably located in the bottom portion of the engine compartment and forwardly of the tunnel housing the snowmobile track, for discharging heated air to the outside. Ambient air is introduced into the air supply chamber through a pumping means, such as a fan operably connected to the engine. The muffler is located relative to the air outlet so that the air in the exiting air chamber is circulated over and cools the muffler prior to being discharged through the air outlet.

18 Claims, 2 Drawing Figures

SNOWMOBILE HAVING NOISE-SUPPRESSION ENGINE COMPARTMENT

BACKGROUND OF THE INVENTION

This invention relates to generally to snowmobiles and, more particularly, to means for reducing the noise emanating from the engine compartment of the snowmobile.

Increasingly stringent vehicle noise control legislation has dictated a substantial reduction in the noise emanating from snowmobiles. The engine and the engine exhaust system constitute one primary source of noise.

SUMMARY OF THE INVENTION

The invention provides a snowmobile having an engine compartment which, except for one or more air inlets and outlets, is closed in a substantially air tight manner in order to reduce the transmission of noise generated by the engine to the outside. The compartment is divided by suitable wall means into an air supply chamber which includes one or more inlets through which ambient air is introduced and an exiting air chamber which communicates with the air supply chamber, preferably through the cooling system of an internal combustion engine located within the engine compartment, and which includes one or more outlets through which heated air is discharged from the engine compartment.

In addition, in accordance with the invention an engine muffler is connected to the engine exhaust port and is located in the exiting air chamber. Means are provided for pumping air from the air supply chamber into the exiting air chamber to maintain therein, while the engine is operating, a pressure above atmosphereic so that the air is circulated over the muffler and other engine exhaust system components prior to being discharged from the exiting air chamber so as to thereby extract heat from the engine exhaust gases and reduce the exhaust noise. Preferably, one of the air outlets is located in the bottom portion of the engine compartment and the muffleris located relative to this air outlet so as to be located in the path of air flow through the exiting air chamber towards the air outlet. The muffler can be located to baffle or cause a change in the direction of this air flow so as to assist in reducing the transmission of noise from the engine compartment.

Also in accordance with the invention, air outlet means is located adjacent to and forwardly of the tunnel housing the snowmobile track so that the air being discharged from the exiting air chamber is discharged downwardly into the snow beneath the snowmobile so that noise is absorbed by the snow.

Also in accordance with the invention, means are provided in the exiting air chamber defining a substantially closed air discharge sub-chamber in which the muffler and means connecting the muffler to the engine exhaust port are located. The air discharge sub-chamber connunicates with the engine cooling system and the air outlet means located in the bottom portion of the engine compartment and at least a portion of the air entering the exiting air chamber through the engine cooling system is diverted through the air discharge sub-chamber to flow in contact with, and thereby cool, the muffler and the engine exhaust system components before being discharged through the air outlet means. The air discharge sub-chamber also includes one or more air inlet openings through with a portion of the pressurized air circulating within the exiting air chamber can enter.

Also in accordance with the invention, one or more additional air outlets are provided in the upper portion of the engine compartment for discharging heated air from the exiting air chamber so as to maximize circulation of air throughout the exiting air chamber during engine operation and to provide for the explusion of heated air from the exiting air chamber after engine shutdown and thereby prevent the engine from becoming overheated.

DESCRIPTION OF THE PREFERRED EMBODIMENTS

Figure 1:
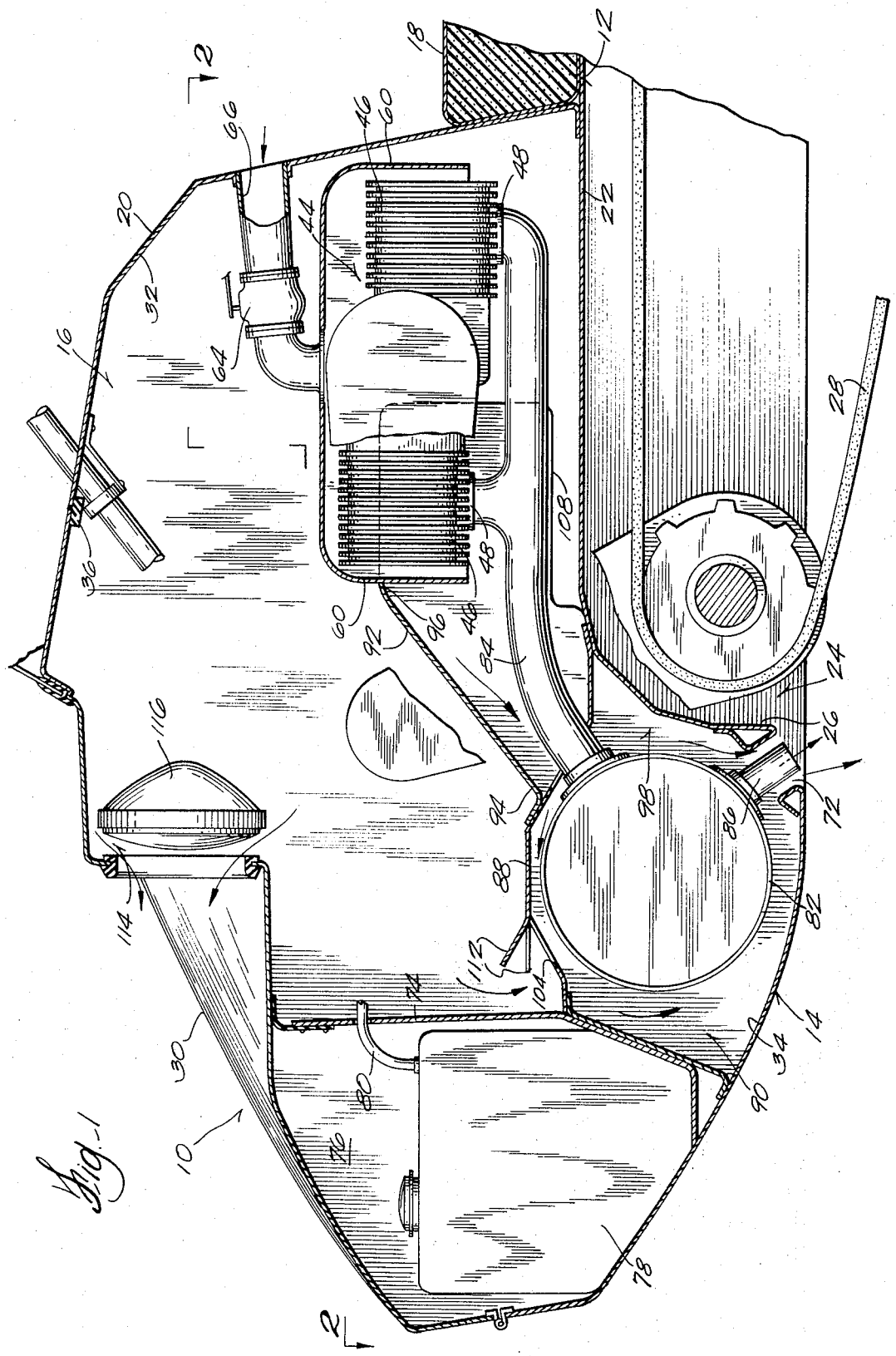
FIG. 1 is a fragmentary, side elevational view, partially broken away and in section, of a snowmobile embodying various features of the invention.
Figure 2:
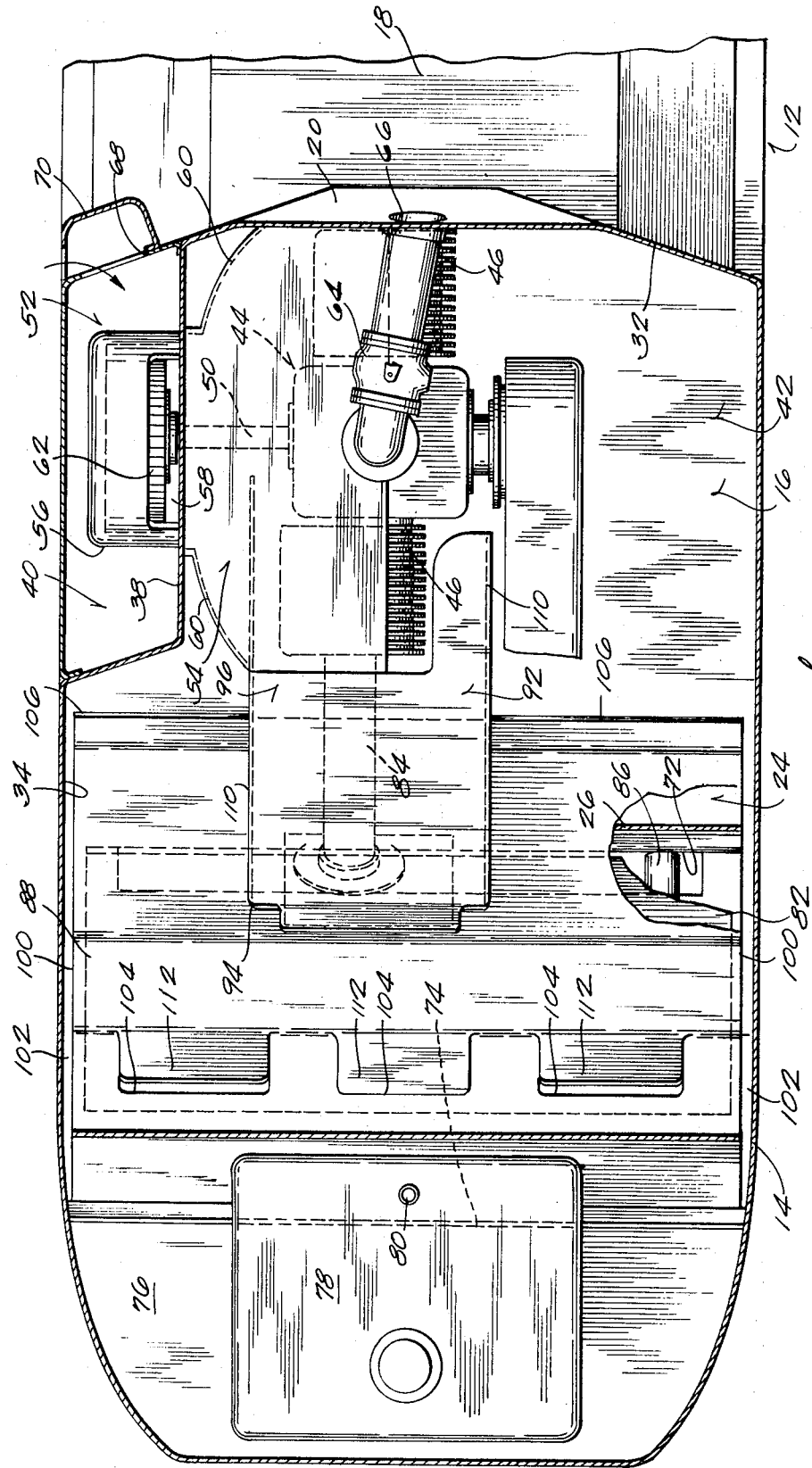
FIG. 2 is a sectional view, partially broken away, taken along the plane designated 2—2 in FIG. 1.

Before explaining the invention in detail, it is to be understood that this invention is not limited in its application to the details of construction and arrangement of the components set forth in the following description and illustrated in the drawings. The invention is capable of other embodiments and of being practiced or carried out in various other ways. Also, it is to be understood that the phraseology or terminology employed herein is for the purpose of description and should not be regarded as limiting.

Shown in FIG. 1 is a snowmobile 10 having a longitudinally extending frame 12 including a forward portion 14 which generally provides the bottom of an engine compartment 16. Extending upwardly from the frame 12 and forwardly of the snowmobile seat 18 (shown fragmentarily) is a transverse partition 20 which provides the rear wall of the engine compartment 16 and can form a dashboard. The frame 12 also includes a portion 22 defining an inverted U-shaped tunnel 24 (shown fragmentarily) which has a front wall 26 forwardly of the transverse partition 20 and which extends principally rearwardly of the transverse partition 20. The tunnel 24 houses an endless belt or track 28 (shown fragmentarily) and supports the seat 18. Extending from the frame portion 14 and from the transverse partition 20 is a hood 30 which completes the engine compartment 16 and which, if desired, can be hinged to the front of the frame portion 14 for pivotal movement between an open position affording access to the engine compartment 16 and a closed position whereby the engine compartment 16 is substantially closed except for air inlet and outlet openings as described below.

In order to reduce sound transmission from the engine compartment 16, the hood 30 is preferably lined with a sound absorbing material, such as a blanket of polyurethane foam. If desired, the interior surface 32 of the transverse partition 20 and the interior surface 34 of the frame portion 14 also can be lined with the same type of material to further reduce sound transmission. In addition, a soft rubber gasket 36 can be provided at the junction of the hood 30 with the transverse partition 20 and with the frame portion 14 so that, when the hood 30 is closed, a substantially air tight seal was provided at this junction, thereby rendering the engine compartment 16 substantially air tight (except for air inlet and outlet openings as described below) so as to reduce emanation of noise from the engine compartment.

In accordance with the invention, the engine compartment 16 is divided by a wall 38 extending in the engine compartment 16 into an air supply chamber 40 and an air exiting chamber 42. A soft rubber gasket can be provided at the junction between the hood 30 and the top margin of the wall 38 so that, when the hood 30 is closed, a substantially air tight seal is provided at this junction. Located within the engine compartment 16 and principally in the exiting air chamber 42 is a conventionally constructed internal combustion engine 44 which is supported from frame 12, preferably by conventional resilient mounts (not shown). Any engine can be employed. In the construction illustrated, the engine 44 is a conventional, oppositely acting two-stroke engine including two air cooled cylinders 46 each including an exhaust port 48 and a piston (not shown) operably connected to a rotary output shaft 50.

As shown in FIG. 1, the engine 44 also includes an air cooling system 52 having means defining an air cooling passage 54 which projects through the wall 38 and communicates between the air supply chamber 40 and the exiting air chamber 42. While various means can be used, in the construction illustrated, such means includes a shroud 56 having an air inlet 58 communicating with the air supply chamber 40 and shroud portions 60 communicating with the exiting air chamber 42. The shroud 56 and the shroud portions 60 are arranged to guide air flow over the engine for cooling such as over the engine cylinders 46.

In accordance with the invention, means are provided for pumping cooling air from air supply chamber 40 into the exiting air chamber 42 so as to maintain the exiting air chamber 42 above atmospheric pressure while the engine 44 is operating and thereby circulate cooling air over hot engine exhaust system components. While various means can be used, in the construction illustrated, such means comprises a conventionally constructed fan 62 which is positioned inside the shroud 56, is connected to and driven by the rotary output shaft 50, and pumps air from the air supply chamber 40 through the engine air cooling passage 54 into the exiting air chamber 42. If desired, a separate passage can be provided through the wall 38 for delivering air from the air supply chamber 40 directly into the exiting air chamber 42 without passing over the engine cylinders 46.

The engine 44 also includes a conventional carburetor 64 and having an inlet 66 which is remote from the exiting air chamber 42. In the construction illustrated, the carburetor air inlet 66 extends through the transverse partition 20 and communicates with the atmosphere. If desired, the carburetor air inlet 66 alternately can extend through the wall 38 and communicate with the air supply chamber 40.

One or more air inlet means are provided in one or more of the hood 30, the transverse partition 20, and the frame portion 14 for introducing ambient air into the air supply chamber 40. While various arrangements can be used, in the construction illustrated, such air inlet means communicates with the air supply chamber 40 and includes an entering air inlet port 68 located in the transverse partition 20 on one side of the snowmobile and preferably further includes a baffle 70 which extends in opposing relation to the entering air inlet port 68 to cause a change in the direction of air flowing into the air supply chamber 40. The baffle 70 is preferably lined with a sound absorbing material.

From the above description, it can be seen that, except for the entering air inlet port 68, the engine cooling air inlet 58, and the carburetor air inlet 66 (if arranged to extend into the air supply chamber 40), the air supply chamber 40 is closed in a substantially air tight manner when the hood 30 is in a closed position.

The exiting air chamber 42 is also substantially air tight, when the hood 30 is closed, except for communication through the engine cooling air shroud 56 and except for one or more air outlet means located in one or more of the hood 30, the transverse partition 20 and the frame portion 14 at a position sufficiently remote from the entering air inlet port 68 to prevent the air exiting from the exiting air chamber 42 from recirculating to the entering air inlet port 68. While various arrangements can be used, in the construction illustrated, such air outlet means includes an exiting air port 72 which is in the form of an elongated slot extending transversely of the frame portion 14 and which is preferably located forwardly and generally adjacent to the tunnel front wall 26. With this preferred location of the exiting area port 72, the cooling air is discharged downwardly into the snow beneath the snowmobile and the absorbent snow absorbs cooling air noise to further reduce noise transmission from the snowmobile. The flow area of the exiting air port 72 is dimensioned so that a positive pressure is maintained in the exiting air chamber 42 by the fan 62 while the engine 44 is operating.

Extending upwardly from the front portion of the frame 12 and forwardly of the transverse partition 20 is a transverse wall 74 which, along with the hood 30, defines a fuel tank compartment 76. Located within the fuel tank compartment 76 is a fuel tank 78 which is suitably supported from the frame 12 and is connected to the engine carburetor 64 by a fuel line 80 (shown fragmentarily) extending through the transverse wall 74.

A conventional muffler 82 is suitably supported from the frame 12 in the lower front portion of the exiting air chamber 42. The muffler 82 is positioned rearwardly of the transverse wall 74, forwardly of the exiting air port 72, and is spaced above the frame portion 14. The muffler 82 is connected to the engine exhaust ports 48 by suitable means, such as an exhaust conduit or pipe 84. Exhaust gases are discharged from the muffler 82 through a discharge conduit or pipe 86 which extends outwardly from the engine compartment 16, preferably through the frame portion 14 and, more preferably, through the exiting air port 72, as shown, so that the exhaust gases are discharged beneath the snowmobile 10.

Because of the heat added to the air passing in contact with the engine cylinder 46 as it flows through the engine cooling air passage 54 and the heat emanating from the muffler 82 and the exhaust pipe 84, the general temperature of the air in the air exiting chamber 42 is substantially higher than the air in the air supply chamber 40.

In accordance with the invention, the air flowing from the air supply chamber 40 into the exiting air chamber 42 is circulated within the exiting air chamber 42 in contact with the muffler 82, the exhaust pipe 84 and other hot engine exhaust system components, such as an emission control device (not shown) before exiting through the exiting air port 72. Such air circulation effects a cooling of these hot exhaust system components, thereby extracting heat from the exhaust gases and reducing the exhaust noise. The desired circulation of air over these components is achieved by arranging the exiting air chamber 42 in a substantially air tight manner as described above so that a pressure above atmospheric pressure is produced in the exiting air chamber 42 by the air being pumped through the engine cooling system by the fan 62. The circulation of air over these components can be further enhanced, in accordance with the invention, by positioning the muffler 82, the exhaust pipe 84 and other hot engine exhaust system components relative to the exiting air port 72 so as to be in the flow path of the air flowing through the exiting air chamber 42 from the engine air cooling system 52 towards the exiting air port 72. Preferably, the muffler 82 is positioned relative to the exiting air port 72, such as forwardly and adjacent to the exiting air port 72 as described above, so as to baffle the air exiting from the exiting air chamber 42, i.e., cause a change in the direction of the air flow, and to thereby assist in reducing the transmission of noise.

Also in accordance with the invention, means are provided in the exiting air chamber 42 defining an air discharge sub-chamber in which the muffler 82, the engine exhaust pipe 84 and other hot engine exhaust system components are located and through which at least a portion of the air exiting from the engine cooling system 52 is diverted to flow in direct contact with the muffler 82 before being discharged from the exiting air chamber 42. While various means can be used, in the construction illustrated, such means includes a generally horizontal, transversely extending shield 88 which is spaced above the muffler 82 and is suitably supported on the frame 12. The shield 88 along with the transverse wall 74 and the frame portion 14 defines an annular-like flow passage 90 partially encircling the outer periphery of the muffler 82, for example, encompasses an arc about the muffler 82 of about 235°, through which the air can flow before exiting air port 72.

The means defining the air discharge sub-chamber can also include an inverted U-shaped baffle 92 which partially surrounds the engine exhaust pipe 84 and extends forwardly and downwardly from the shroud portions 60. The lower end 94 of the baffle 92 is connected to the shield 88. As shown, the upper end 96 of the baffle 92 is positioned to partially cover the outlet of the shroud portions 60 so as to capture a portion, for example, 30–40 percent, of the air flowing from the engine cooling air passage 54 and divert it towards the shield 88. The remaining air flowing from the engine cooling air passage 54 passes into the air exiting chamber 42 and circulates therein to provide cooling of the engine compartment as described below. The air flowing through the baffle 92 towards the shield 88 flows over and cools the engine exhaust pipe 84 and other hot engine exhaust system components which may be located inside the baffle 92. A portion of the air flowing from the lower end 94 of the baffle 92 flows through the annular flow passage 90, to cool a corresponding portion of the muffler 82, and then exits through the exiting air port 72. Another portion of the air flowing from the lower end 94 of the baffle 92 flows through the flow passage 98 defined by the muffler 82 and the tunnel front wall 26, to cool a corresponding portion of the muffler 82, and then exits through the exiting air port 72. In either case, the flow direction of the exiting cooling air is changed or baffled, thereby assisting in reducing the transmission of noise from the engine compartment.

If desired, the upper end 96 of the baffle 92 can be arranged so that all or substantially all of the air flowing from the engine cooling air passage 54 is captured and diverted through the baffle 92 to flow over the engine exhaust pipe 84 and the muffler 82 as described above.

The outer ends 100 of the shield 88 are preferably spaced inwardly from the frame portion 14 to define openings 102 into the annular flow passage 90. Also, one or more top openings 104 are preferably provided in the shield 88. The pressurized air circulating through the exiting air chamber 42 can enter through the openings 102 and 104 into the annular flow passage 90 and flow therethrough towards the exiting air port 72 to provide further cooling of the muffler 82. The rear edge portions 106 of the shield 88 between the baffle 92 and the other ends 100 and the lower edges 108 of the baffle side walls 110 can be vertically spaced from the frame portion 14 to provide further openings to afford the flow of the pressurized air in the exiting air chamber 42 towards the exiting air port 72. Thus, at least a portion of the pressurized air flowing from the engine cooling air passage 54 is diverted to flow through the air discharge sub-chamber defined by the baffle 92 and the shield 88 to cool the engine exhaust pipe 84, other hot engine exhaust system components, and the muffler 82. Another portion of the air flowing from the engine cooling air passage 54 is first circulated through the exiting air chamber 42, to first provide cooling of the engine compartment, and then enters through the various above-described openings into the air discharge sub-chamber and flows therethrough towards the exiting air port 72 to provide further cooling of the muffler 82 and/or the engine exhaust system components.

The shield 88 and the baffle 92 also act as barriers to radiant heat being emitted by the muffler 82 and the exhaust pipe 84 to thereby reduce the heat input into the engine compartment 16 and to thereby assist, along with the cooling effect of the air circulating within the exiting air compartment chamber 42 outside of the shield 88 and the baffle 92, in preventing an overtemperature condition from developing in the substantially closed engine compartment.

In order to provide maximum shielding against radiant heat being emitted from the muffler 82 into the engine compartment, the shield 88 is provided with generally horizontally extending, integral flaps or tabs 112 which hood or cover the openings 104 so as to minimize direct radiant heat paths from the muffler 82 into the engine compartment 16.

In order to obtain maximum circulation of air throughout the exiting air chamber 42, and thereby further prevent overheating of the engine and to provide for expulsion of heated air from the engine compartment after the engine is shutoff, one or more air outlet means can be provided in the upper portion of either the hood or the transverse partition through which the heated air in the exiting air chamber is discharged to the atmosphere. While various arrangements can be used, in the construction illustrated, such air outlet means comprises a restricted aperture 114 generally surrounding a headlight 116 which is mounted on the upper portion of the hood 30. With this arrangement, the heated air exiting through the aperture 114 flows in contact with the headlight 116 and thereby assists in preventing the headlight from becoming iced. The flow area of the aperture 114 is dimensioned so that a positive pressure is maintained in the air exiting chamber 42 by the fan 62, while the engine 44 is operating.

From the above detailed description, it can be seen that the invention provides an engine compartment which is substantially closed to minimize the transmission of noise therefrom, is arranged to provide cooling of hot engine exhaust components to reduce exhaust noise, and is arranged to provide circulation of cooling air throughout the exiting air chamber so that the engine does not become overheated.

The various features of the invention are set forth in the following claims:

1. A snowmobile comprising a frame including a generally hroizontally extending forward portion and a tunnel portion extending rearwardly from said frame portion, an endless track mounted in said tunnel portion, a seat located above said tunnel portion, a transverse partition located forwardly of said seat and extending upwardly from said frame portion, a hood extending forwardly of said transverse partition and above said frame portion and defining with said frame portion and said transverse partition a substantially closed engine compartment, wall means extending in said engine compartment dividing said engine compartment into an air supply chamber and an exiting air chamber, an internal combustion engine located in said engine compartment, air inlet means located in one of said transverse partition, said hood, and said frame portion for introducing ambient air into said air supply chamber, means defining an air passage communicating between said air supply chamber and said exiting air chamber, means within said engine compartment for pumping air from said air supply chamber into said exiting air chamber through said air passage means to pressurize said exiting air chamber, air outlet means in one of said transverse partition, said hood, and said frame portion and remotely spaced from said air inlet means for discharging air from said air exiting chamber, and a muffler located in said exiting air chamber and positioned relative to said air outlet means so as to be in the flow path of the air flowing through said exiting air chamber and discharging through said air outlet means.

2. A snowmobile according to claim 1 wherein said muffler is positioned relative to said air outlet means to baffle the air flowing through said air outlet means.

3. A snowmobile according to claim 2 including means located in said exiting air chamber and cooperating with said muffler and said frame portion to define a substantially closed air discharge sub-chamber in which said muffler is located and through which at least a portion of the air entering said exiting air chamber through said air passage means flows in contact with the outer surface of said muffler before being discharged from said exiting air chamber through said air outlet means.

4. A snowmobile according to claim 3 wherein said engine includes an exhaust gas port and said snowmobile further includes means located in said air discharge subchamber for connecting said muffler to said engine exhaust port.

5. A snowmobile according to claim 3 wherein said air discharge sub-chamber defining means includes a shield supported on said frame in said exiting air chamber, positioned above said muffler, and defining with said frame portion and said muffler and annular-like air flow passage partially surrounding the outer surface of said muffler.

6. A snowmobile according to claim 5 wherein said air discharge sub-chamber defining means further includes a generally inverted U-shaped baffle supported on said frame in said exit air chamber, partially surrounding said muffler connecting means, extending from said shield towards said air passage means outlet, and defining with said muffler connecting means and said frame portion an air flow passage which communicates with said annular flow passage and said air passage means.

7. A snowmobile according to claim 5 wherein said shield includes one or more air inlet openings for admitting air from said exiting air chamber into said annular flow passage.

8. A snowmobile according to claim 7 wherein said shield also includes a generally horizontally extending flap hooding said shield air inlet opening so as to minimize the emission of radiant heat from said muffler into said exiting air chamber through said shield air inlet opening.

9. A snowmobile according to claim 1 wherein said engine includes a rotary output shaft, wherein said air passage means comprises an engine cooling system including means defining an engine cooling air passage directing the flow of air over said engine and communicating between said air supply chamber and said exiting air chamber, and wherein said pumping means comprises a fan located in said engine cooling air passage and operably connected to said rotary output shaft.

10. The snowmobile according to claim 1 wherein said air outlet means is located in said frame portion and wherein said muffler is located forwardly of said air outlet means.

11. A snowmobile according to claim 1 wherein said tunnel portion includes a forward end, and wherein said air outlet means is located in said frame portion forwardly of and generally adjacent to said tunnel forward end.

12. A snowmobile according to claim 11 wherein said air outlet means is a transversely extending, slotted opening in said frame portion.

13. A snowmobile according to claim 12 wherein said muffler includes an exhaust gas discharge outlet means extending through said slotted opening.

14. A snowmobile according to claim 1 including an additional air outlet means in the upper portion of one of said hood and said transverse partition for discharging air from said exiting air chamber.

15. A snowmobile according to claim 14 including a headlight mounted on said hood and wherein said additional air outlet means comprises an aperture located adjacent to said headlight so that the air exiting from said exiting air chamber through said aperture flows in contact with said headlight.

16. A snowmobile comprising a frame including a generally horizontally extending forward portion and a tunnel portion extending rearwardly from said frame portion and having a forward end, an endless track mounted in said tunnel portion, a seat located above said tunnel portion, a transverse partition located forwardly of said seat and extending upwardly from said frame portion, a hood extending forwardly of said transverse partition and above said frame portion and defining with said frame portion and said transverse partition a substantially closed engine compartment, wall means extending in said engine compartment and dividing said engine compartment into an air supply chamber and an exiting air chamber, an internal combustion located in said engine compartment and including an exhaust port and a rotary output shaft, an engine cooling system including means defining an engine cooling air passage communicating between said air supply chamber and said exiting air chamber and having an outlet in said exiting air chamber, air inlet means located in one of said transverse partition, said hood, and said frame portion for introducing ambient air into said air supply chamber, air outlet means in said frame portion including means defining an air outlet port in said frame portion and located forwardly of said tunnel portion forward end for discharging air from said exiting air chamber and beneath said snowmobile, a fan operably connected to said engine rotary output shaft for pumping air from said air supply chamber into said exiting air chamber through said engine cooling air passage so as to pressurize said exiting air chamber, a muffler located in said exiting air chamber forwardly of said air outlet port, exhaust gas discharge outlet means extending from said muffler to outside said engine compartment, means connecting said muffler with said engine exhaust port, and a generally horizontal, transversely extending shield supported on said frame in said air exiting chamber, positioned above said muffler and defining with said frame portion and said muffler an annular-like air flow passage which partially surrounds the outer surface of said muffler and through which at least a portion of the air flowing into said exiting air chamber from said engine cooling air passage outlet passes before being discharged from said exiting air chamber through said air outlet port.

17. A snowmobile according to claim 16 further including a baffle at least partially surrounding said muffler connecting means, extending from said shield towards said engine cooling air passage outlet, and defining with said muffler connection means and said frame portion an air flow passage which communicates with said annular flow passage and said engine cooling air passage outlet.

18. A snowmobile according to claim 16 including an additional air outlet port in the upper portion of one of said hood and said transverse partition for discharging air from said exiting air chamber.

* * * * *

PO-1050
(5/69)

UNITED STATES PATENT OFFICE
CERTIFICATE OF CORRECTION

Patent No. 3,773,127                Dated November 20, 1973

Inventor(s) Olav Aaen et al

It is certified that error appears in the above-identified patent and that said Letters Patent are hereby corrected as shown below:

In the Abstract

| | |
|---|---|
| lines 15 and 16 | after "Ambient air is introduced into the air supply chamber through", insert --- an air inlet and is delivered to the exiting air chamber by --- |
| Column 1, line 42 | delete "muffleris", insert --- muffler is --- |
| Column 2, line 1 | delete "with", insert --- which --- |
| Column 2, line 9 | delete "explusion", insert --- expulsion -- |
| Column 3, line 22 | delete "1", insert --- 2 --- |
| Column 6, line 60 | delete "explusion", insert ex- expulsion -- |
| Column 8, line 8 | after "5", insert --- and including means connecting said engine to said muffler and --- |
| Column 8, line 9 | delete "air discharge sub-chamber defining means", insert before "further", --- exiting air chamber --- |
| Column 8, line 11 | delete "on", insert --- by --- |
| Column 8, line 11 | delete "in said exit air chamber" |

Signed and sealed this 1st day of October 1974.

(SEAL)
Attest:

McCOY M. GIBSON JR.                    C. MARSHALL DANN
Attesting Officer                       Commissioner of Patents